(12) United States Patent
Kambe et al.

(10) Patent No.: US 11,380,030 B2
(45) Date of Patent: Jul. 5, 2022

(54) DRAWING MANAGEMENT APPARATUS, DRAWING MANAGEMENT SYSTEM, AND DRAWING MANAGEMENT METHOD

(71) Applicant: YOKOGAWA ELECTRIC CORPORATION, Musashino (JP)

(72) Inventors: Takahiro Kambe, Musashino (JP); Tatenobu Seki, Musashino (JP); Nobuaki Ema, Musashino (JP); Masato Annen, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/131,742

(22) Filed: Dec. 23, 2020

(65) Prior Publication Data
US 2021/0279925 A1   Sep. 9, 2021

(30) Foreign Application Priority Data
Mar. 6, 2020   (JP) .............................. JP2020-039170

(51) Int. Cl.
*G06T 11/20* (2006.01)
*G06F 40/197* (2020.01)

(52) U.S. Cl.
CPC .......... *G06T 11/206* (2013.01); *G06F 40/197* (2020.01); *G06T 2210/04* (2013.01)

(58) Field of Classification Search
CPC . G06T 11/206; G06T 2210/04; G06F 40/197; G06F 30/398; G06F 40/194; G06Q 10/00; G06Q 10/0631; G06Q 10/103; G06Q 50/04; G06K 9/6201
See application file for complete search history.

(56) References Cited

U.S. PATENT DOCUMENTS

2009/0063427 A1*   3/2009   Zuta ...................... G06F 40/247
2018/0081350 A1*   3/2018   Seki .................... G05B 23/0205

FOREIGN PATENT DOCUMENTS

JP           4686215 B2       5/2011
JP        2017120632 A        7/2017

* cited by examiner

*Primary Examiner* — Jeffery A Brier
(74) *Attorney, Agent, or Firm* — Kenja IP Law PC

(57) ABSTRACT

A drawing management apparatus is for managing various types of drawings of a plant and includes a processor and a communication interface. The processor is configured to notify, via the communication interface, a user or terminal apparatus handling a second type of drawing different from a first type of drawing of information related to a difference in the first type of drawing acquired based on a comparison between a new version and an old version of the first type of drawing.

13 Claims, 15 Drawing Sheets

FIG. 6

|  | Main instrumentation | Other instrumentation | Control valve | Manual valve | Piping | Layout information |
|---|---|---|---|---|---|---|
| Drawing A (PFD) | ○ | × | ○ | × | × | × |
| Drawing B (P&ID) | ○ | ○ | ○ | ○ | ○ | × |
| Drawing C (3D model) | ○ | ○ | ○ | ○ | ○ | ○ |

FIG. 8

| | Drawing B2 | Drawing B3 | Existence of difference | Device ID | Pipe number | Drawing A2 | Drawing C2 |
|---|---|---|---|---|---|---|---|
| Tank | ○ | ○ | No | T1001 | L100 | | |
| C-Valve | — | ○ | Yes | CV201 | L100 | Reflected | Reflected |
| Tank | ○ | ○ | No | T1002 | L100 | | |
| C-Valve | — | ○ | Yes | CV202 | L100 | Reflected | Non-reflected |
| Reactor | ○ | ○ | No | R101 | L100 | | |

DRAWING MANAGEMENT APPARATUS, DRAWING MANAGEMENT SYSTEM, AND DRAWING MANAGEMENT METHOD

CROSS REFERENCE TO RELATED APPLICATION

This application claims priority to and the benefit of Japanese Patent Application No. 2020-39170 (filed on Mar. 6, 2020), the entire contents of which are incorporated herein by reference.

TECHNICAL FIELD

The present disclosure relates to a drawing management apparatus, a drawing management system, and a drawing management method.

BACKGROUND

As a method for identifying objects, such as a pump, from 3D data of a plant, patent literature (PTL) 1, for example, discloses a method for generating 2D data from 3D data, acquired by scanning the outline of the plant, and comparing the 2D data with known 2D data to identify unknown objects.

CITATION LIST

Patent Literature

PTL 1: JP 2017-120632 A

SUMMARY

A drawing management apparatus according to an embodiment is a drawing management apparatus for managing various types of drawings of a plant and includes a processor and a communication interface. The processor is configured to notify, via the communication interface, a user or terminal apparatus handling a second type of drawing different from a first type of drawing of information related to a difference in the first type of drawing acquired based on a comparison between a new version and an old version of the first type of drawing.

A drawing management system according to an embodiment includes the aforementioned drawing management apparatus and the aforementioned terminal apparatus.

A drawing management method according to an embodiment is a drawing management method for managing various types of drawings of a plant using a computer and includes notifying a user or terminal apparatus handling a second type of drawing different from a first type of drawing of information related to a difference in the first type of drawing acquired based on a comparison between a new version and an old version of the first type of drawing.

BRIEF DESCRIPTION OF THE DRAWINGS

In the accompanying drawings:

FIG. 6 illustrates an overview of a data table used in step S203;

FIG. 8 illustrates an overview of a list used in step S303;

DETAILED DESCRIPTION

Figure 1:
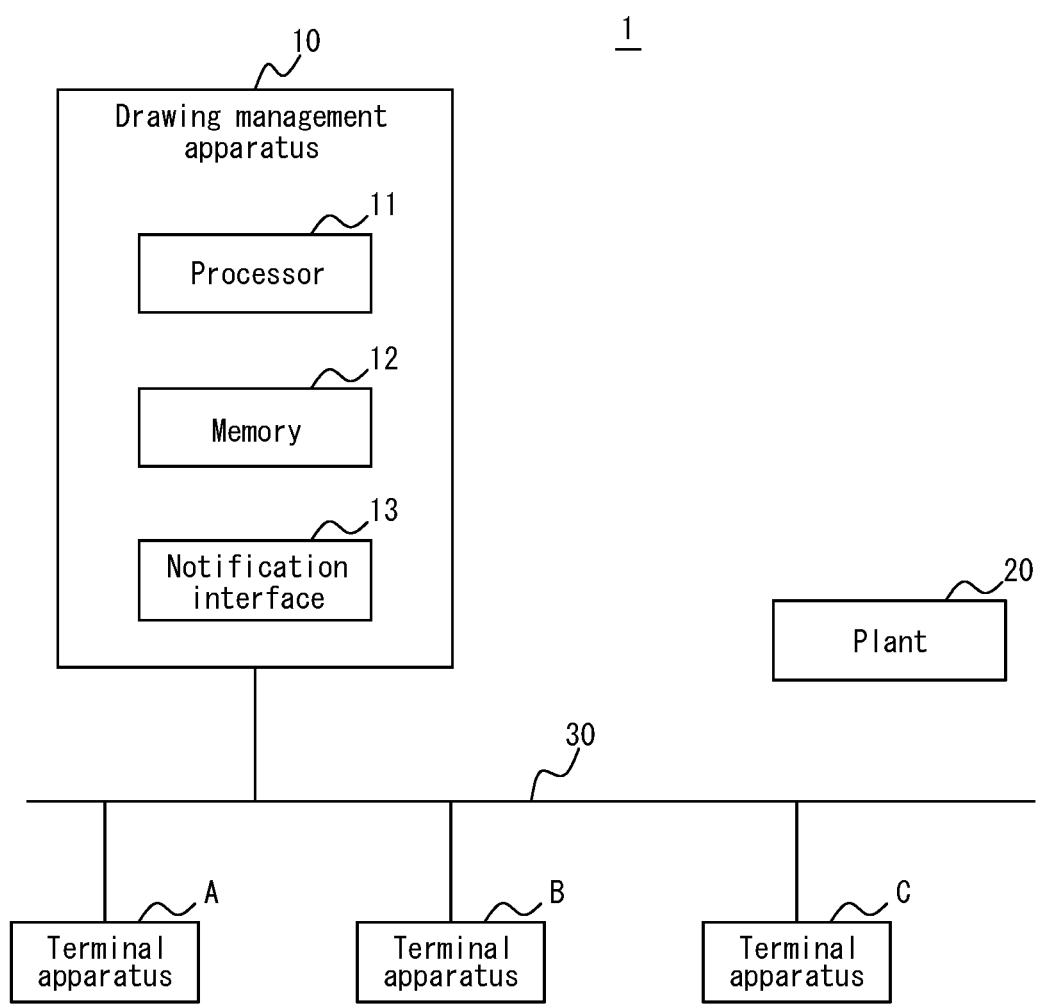
FIG. 1 is a functional block diagram illustrating the configuration of a drawing management system according to an embodiment.

As for a method for generating 2D data from 3D data, acquired by scanning the outline of the plant, and comparing the 2D data with known 2D data to identify unknown objects, it is assumed that the known 2D data is the latest data. Unknown objects therefore cannot be identified when the known 2D data is not the latest data. Various types of diagrams are used for plant design and the like, such as a process flow diagram (PFD), a piping and instrument diagram (P&ID) that provides details on the PFD, and a 3D piping diagram (3D plant diagram) that includes physical information on the P&ID. When corrections or the like need to be made to one of these diagrams, such as the PFD, the changes also need to be reflected in the P&ID and the 3D piping diagram. Tasks such as correcting drawings may, however, be divided up among a plurality of employees in charge in the plant. The task of reflecting corrections may therefore be neglected, or the content of the corrections forgotten, for reasons such as the employee in charge changing or being too busy. Consequently, consistency across various types of drawings, and hence consistency between the drawings and the actual plant, might not be secured. In particular, if a P&ID, 3D piping diagram, and the like are created based on a PFD or other drawing that is not consistent with the actual state of the plant, the inconsistent portion included in the drawing spreads to other drawings. Consistency across various types of drawings, and hence consistency between the drawings and the actual plant, is even less secure.

It would therefore be helpful to provide a drawing management apparatus, a drawing management system, and a drawing management method capable of securing consistency between various types of drawings, and hence consistency between the drawings and an actual plant.

A drawing management apparatus according to an embodiment is a drawing management apparatus for managing various types of drawings of a plant and includes a processor and a communication interface. The processor is configured to notify, via the communication interface, a user or terminal apparatus handling a second type of drawing different from a first type of drawing of information related to a difference in the first type of drawing acquired based on a comparison between a new version and an old version of the first type of drawing.

With this configuration, consistency between various types of drawings, and hence consistency between the drawings and an actual plant, can be secured.

In an embodiment, the processor may notify, via the communication interface, the user or the terminal apparatus handling the second type of drawing of information related to an element necessary in the second type of drawing among elements included in the difference in the first type of drawing.

Unnecessary information is therefore not provided to each employee in charge, eliminating unnecessary confirmation and improving work efficiency.

In an embodiment, the processor may refer to a data table including information related to necessity of elements in the various types of drawing of the plant and judge whether any of the elements included in the difference in the first type of drawing is necessary in the second type of drawing.

This configuration enables a more efficient judgment of whether to provide notification of information related to elements necessary in the second type of drawing among elements included in the difference in the first type of drawing.

In an embodiment, the processor may notify, via the communication interface, the user or the terminal apparatus handling the second type of drawing of information related to an element not reflected in the second type of drawing among elements included in the difference in the first type of drawing.

In conditions such that each employee in charge can reflect changes made to a certain drawing in other drawings, this configuration prevents each employee in charge from being notified of already reflected information, thereby eliminating unnecessary confirmation and improving work efficiency.

In an embodiment, the processor may perform the comparison when acquiring the new version of the first type of drawing.

This enables employees in charge to be informed quickly of a change from the old version to the new version.

In an embodiment, the processor may perform the comparison when a predetermined period is reached.

This prevents each employee in charge from needing to address changes in the drawings continuously. Furthermore, changes in the drawings can be addressed when the predetermined time appropriately set by each employee in charge is reached, thereby increasing work efficiency and convenience.

In an embodiment, the processor may notify, via the communication interface, the user or the terminal apparatus handling the second type of drawing of information related to the difference in the first type of drawing when the difference in the first type of drawing exceeds a predetermined threshold.

If a large number of corrections or the like are made to a drawing at a certain point in time after the start in this configuration, each employee in charge is notified of the difference resulting from the changes to the drawing, even if the predetermined period has not been reached from the start. Work efficiency and convenience are thereby further increased.

In an embodiment, the processor may notify, via the communication interface, a user or terminal apparatus handling the first type of drawing of information related to a difference acquired by excluding the difference in the first type of drawing from a difference in the second type of drawing acquired based on a comparison between a new version and an old version of the second type of drawing.

With this configuration, consistency between various types of drawings of the plant can be secured even when each employee in charge makes envisioned changes to a drawing while at the same time reflecting the difference resulting from changes made to a drawing by another employee in charge.

A drawing management system according to an embodiment includes the aforementioned drawing management apparatus and the aforementioned terminal apparatus.

With this configuration, consistency between various types of drawings, and hence consistency between the drawings and an actual plant, can be secured.

A drawing management method according to an embodiment is a drawing management method for managing various types of drawings of a plant using a computer and includes notifying a user or terminal apparatus handling a second type of drawing different from a first type of drawing of information related to a difference in the first type of drawing acquired based on a comparison between a new version and an old version of the first type of drawing.

With this configuration, consistency between various types of drawings, and hence consistency between the drawings and an actual plant, can be secured.

According to the present disclosure, a drawing management apparatus, a drawing management system, and a drawing management method capable of securing consistency between various types of drawings, and hence consistency between the drawings and an actual plant, can be provided.

Embodiments of the present disclosure are described below with reference to the drawings. Identical reference signs in the drawings indicate identical or equivalent constituent elements.

Drawing Management System

A configuration of a drawing management system 1 according to the present embodiment is described with reference to FIG. 1.

The drawing management system 1 includes a drawing management apparatus 10, a terminal apparatus A corresponding to the first terminal apparatus, a terminal apparatus B corresponding to the second terminal apparatus, and a terminal apparatus C corresponding to the third terminal apparatus. The drawing management apparatus 10 manages various types of drawings of the plant 20 and can communicate with the terminal apparatus A, the terminal apparatus B, and the terminal apparatus C via a network 30, such as the Internet. The number of terminal apparatuses is not limited to three and may be any number.

The drawing management apparatus 10 is a computer, such as a personal computer (PC) or a server connected to a cloud computing system or the like, but is not limited to these examples.

The drawing management apparatus 10 includes a processor 11, a memory 12, and a communication interface 13.

The processor 11 includes one or more processors. The processor may, for example, be a general-purpose processor, such as a central processing unit (CPU), or a dedicated processor specialized for particular processing. The processor 11 performs processing related to the operation of the drawing management apparatus 10 while controlling each component of the drawing management apparatus 10.

The memory 12 includes one or more semiconductor memories, one or more magnetic memories, one or more optical memories, or a combination of these. The semiconductor memory is, for example, random access memory (RAM) or read only memory (ROM). Information used in operations of the drawing management apparatus 10 and information acquired by operations of the drawing management apparatus 10 are stored in the memory 12. Examples of information that can be stored in the memory 12 include various types of drawings of the plant 20, elements necessary in each type of drawing, expression rules of various types of drawings, comparison rules between the same type of drawing, results of comparison between the same type of drawing, a registration history of each type of drawing, a notification history related to the difference resulting from a change to each type of drawing, a reflection history of differences, and information related to terminal apparatuses A through C to be notified, addresses of users, such as employees in charge, who handle various types of drawings, work responsibilities, and the like.

The communication interface 13 includes one or more communication interfaces capable, for example, of communicating over the Internet, a gateway, a local area network (LAN), or the like. The communication interface 13 receives information used in operations of the drawing management apparatus 10 and transmits information acquired by operations of the drawing management apparatus 10.

The operations of the drawing management apparatus 10 are implemented by a processor included in the processor 11 executing a program stored in the memory 12. The program may be stored on a non-transitory computer-readable medium.

The terminal apparatuses A, B, C are, for example, a mobile phone, smartphone, tablet, or PC or other computer, but these examples are not limiting. The terminal apparatuses A, B, C have applications or the like necessary for management of the various types of drawings of the plant 20 installed thereon as appropriate and are used by the users that handle the various types of drawings. The users that handle the various types of drawings are not limited to the employees in charge of the various types of drawings and also include other parties involved with the drawings, such as a drawing supervisor, a correction group leader, and a manager of a plurality of drawings or of the entire plant.

In addition to an industrial plant such as a chemical plant, examples of the plant 20 include a plant for managing a well site, such as a gas field or oil field, and the surrounding area. Additional examples of the plant 20 may include a plant for managing power generation such as water power, thermal power, nuclear power, or the like; a plant for managing environmental power generation such as solar power, wind power, or the like; and a plant for managing water and sewage, a dam, or the like.

In the above-described configuration, a portion or all of the processing of the memory 12 in the drawing management apparatus 10 may be carried out by an external memory device capable of communicating with the drawing management apparatus 10 and the terminal apparatuses A, B, C. In addition to the above-described configuration, the drawing management system 1 may include any appropriate 3D scanning apparatus capable of scanning the outline of the plant 20 in 3D and any appropriate terminal apparatus capable of communicating with the 3D scanning apparatus. The drawing management system 1 may also include any appropriate terminal apparatus capable of managing the system overall.

First Processing Example

Figure 2:
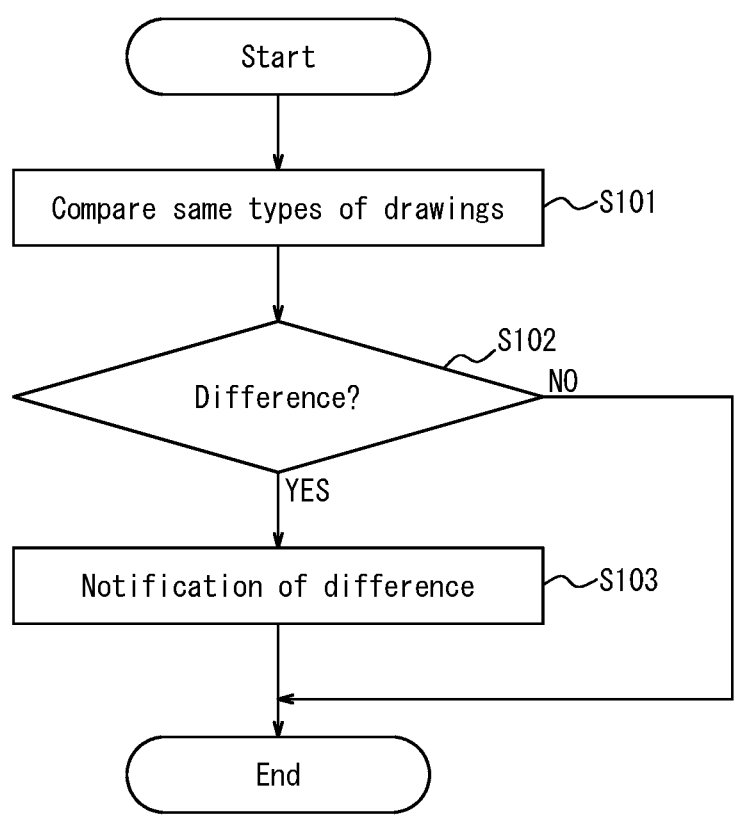
FIG. 2 is a flowchart illustrating a first processing example in the drawing management system according to an embodiment.

A first processing example of the drawing management system 1 according to the present embodiment is described with reference to FIGS. 2 and 3. The first processing example corresponds to an embodiment of a drawing management method according to the present disclosure.

First, a drawing A1 created by employee in charge A, a drawing B1 created by employee in charge B, and a drawing C1 created by employee in charge C are assumed to be registered in advance in the memory 12 of the drawing management apparatus 10. The drawing A1 is, for example, a process flow diagram (PFD). The drawing B1 is, for example, a piping and instrument diagram (P&ID). The drawing C1 is, for example, a 3D piping diagram. The drawing A1, drawing B1, and drawing C1 may be registered in any order. The types of drawings are only non-limiting examples.

The first processing example is assumed to start at the point in time when the employee in charge A has used the terminal apparatus A to change the drawing A1, thereby creating a drawing A2, and to register the drawing A2 in the memory 12 of the drawing management apparatus 10. The processor 11 of the drawing management apparatus 10 may extract the states of the drawing A2, the drawing B1, and the drawing C1 at this point in time as a snapshot or the like. The snapshot has the effect of identifying drawings to be compared and drawings in which a difference is to be reflected. If a drawing B2 is registered in the drawing management apparatus 10 after the snapshot in this case, the drawings to be compared are still the drawing A2, the drawing B1, and the drawing C1 subjected to the snapshot. Processing related to the drawing B2 is performed separately, as described below. The drawings A1 and A2 are both PFDs and may be abbreviated as the drawing A. The drawings B1 and B2 are both P&IDs and may be abbreviated as the drawing B. The drawings C1 and C2 are both 3D piping diagrams and may be abbreviated as the drawing C.

In step S101, the processor 11 of the drawing management apparatus 10 acquires the drawings A1 and A2, which are the same type of drawing, from the memory 12 and compares the drawings A1 and A2. In the first processing example, the drawing A1 corresponds to an old version of the first type of drawing, and the drawing A2 corresponds to a new version of the first type of drawing.

In step S102, the processor 11 of the drawing management apparatus 10 judges whether a difference ΔA exists between the drawings A1 and A2. When the difference ΔA exists (step S102: YES), the processing proceeds to step S103. When no difference ΔA exists (step S102: NO), the present processing ends. However, when no difference ΔA exists, the processor 11 may, via the communication interface 13, notify a party involved with the drawing A that no difference ΔA exists. The party involved with the drawing A can thereby recognize that the drawing A has been newly registered while confirming that no changes are included in the registered drawing A. No difference ΔA could exist when only the revised edition number of the drawing A has been updated. Recognizing this enables parties involved with the drawing A to learn that the revised edition has no changes and to pay greater attention. This can also prevent unnecessary notifications from being sent to the parties involved with other types of drawings. The drawings A1 and A2 are the same type of drawing with elements and expressions that are the same or similar. Accordingly, the processor 11 of the drawing management apparatus 10 can use any appropriate image analysis technique to make the judgment of step S102. This example is not limiting, however, and the processor 11 may make the judgment of step S102 after converting the drawings A1 and A2 to any appropriate comparison model or the like including information indicating the elements in the drawings and the relationship between the elements.

In the case of proceeding from step S102 to step S103, the processor 11 of the drawing management apparatus 10 notifies the terminal apparatus B and the terminal apparatus C of the difference ΔA via the communication interface 13 in step S103. The employee in charge B who handles the drawings B then uses the terminal apparatus B to create a drawing B2 reflecting the difference ΔA in the drawing B1 and register the drawing B2 in the memory 12 of the drawing management apparatus 10. The employee in charge C who handles the drawings C uses the terminal apparatus C to create a drawing C2 reflecting the difference ΔA in the drawing C1 and registers the drawing C2 in the memory 12 of the drawing management apparatus 10. In the first processing example, the drawings B and C correspond to the second type of drawing. Hereinafter, the drawings in which an inter-drawing difference is detected to become the source of a notification are the first type of drawing, and drawings for which notification of the difference is received are the second type of drawing. A plurality of the second type of drawings may be recipients of notification as in the present example, in which the difference in the drawing A is notified to other drawings B, C, but the recipients of notification are not limited to the drawings B, C. As described above, the targets for reflecting the difference ΔA are the drawings B1, C1, which exist at the point when the drawing A2 is registered and are the latest versions at that point. The processor 11 may, at the time of notification, provide notification after identifying these drawings as drawings in which the difference is to be reflected. Information such as the above-described snapshot may be used for this identification.

With the first processing example, consistency between various types of drawings related to the plant 20, and hence consistency between the drawings and the actual plant, can be secured. In particular, the first processing example begins when the employee in charge A has registered the drawing A2. By starting at the point when a change occurs in a drawing related to the plant 20, this processing can quickly inform the employees in charge B and C of the change made by the employee in charge A from the drawing A1 to the drawing A2. The case of providing notification of a difference resulting from a change to the drawing A1 has been described in the first processing example, but notification of a difference resulting from a change to the drawing B1 or C1 may similarly be provided to the employees in charge of other drawings or the like. Instead of the processing in step S103, the processor 11 of the drawing management apparatus 10 may, for example, automatically reflect the difference ΔA in the drawings B1 and C1.

Second Processing Example

Figure 4:
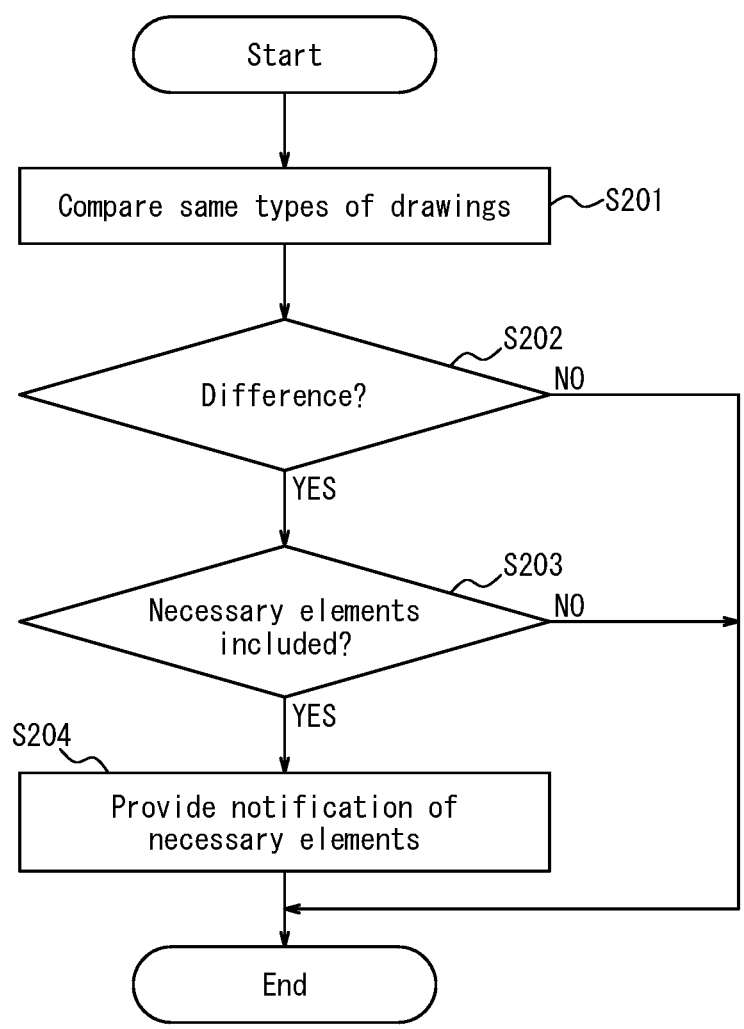
FIG. 4 is a flowchart illustrating a second processing example in the drawing management system according to an embodiment.
Figure 5:
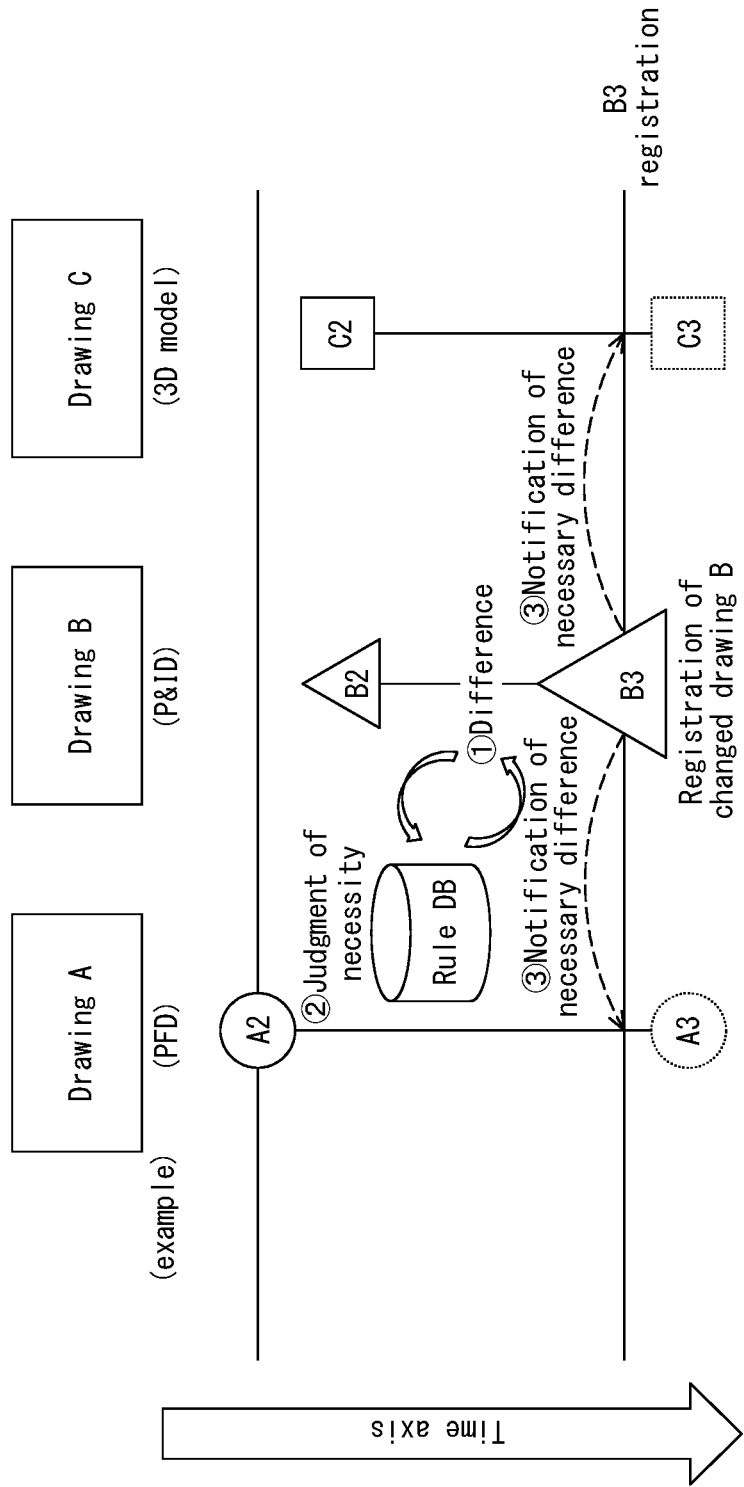
FIG. 5 illustrates an overview of the second processing example.

A second processing example of the drawing management system 1 according to the present embodiment is described with reference to FIGS. 4 and 5. The second processing example corresponds to an embodiment of a drawing management method according to the present disclosure.

When the types of drawings differ, the elements included in the drawings also differ, and the information amount differs. For example, the information amount increases in the order of PFD, P&ID, and 3D piping diagram. In particular, the information amount is extremely small in a PFD, whereas elements not needed in a PFD may be found among the elements included in the difference resulting from a change to a P&ID, for example. Specifically, suppose that a manual valve is added in a P&ID. Manual valves are depicted in a 3D piping diagram, but not in a PFD. Therefore, it is meaningless for the employee in charge A of the PFD to be notified of the addition of a manual valve. To address this, an example of providing notification of elements necessary in the drawings A2 and C2, among the elements included in the difference due to a change from the drawing B2 to the drawing B3, is described in the second processing example.

First, a drawing A2 created by employee in charge A, a drawing B2 created by employee in charge B, and a drawing C2 created by employee in charge C are assumed to be registered in advance in the memory 12 of the drawing management apparatus 10. The drawing A2, drawing B2, and drawing C2 may be registered in any order. The second processing example is assumed to start at the point in time when the employee in charge B has used the terminal apparatus B to change the drawing B2, thereby creating a drawing B3, and to register the drawing B3 in the memory 12 of the drawing management apparatus 10. The processor 11 of the drawing management apparatus 10 may extract the states of the drawing A2, the drawing B3, and the drawing C2 at this point in time as a snapshot or the like. The drawings A2 and A3 are both PFDs and may be abbreviated as the drawing A. The drawings B2 and B3 are both P&IDs and may be abbreviated as the drawing B. The drawings C2 and C3 are both 3D piping diagrams and may be abbreviated as the drawing C. The types of drawings are only non-limiting examples.

In step S201, the processor 11 of the drawing management apparatus 10 acquires the drawings B2 and B3, which are the same type of drawing, from the memory 12 and compares the drawings B2 and B3. In the second processing example, the drawing B2 corresponds to an old version of the first type of drawing, and the drawing B3 corresponds to a new version of the first type of drawing.

In step S202, the processor 11 of the drawing management apparatus 10 judges whether a difference ΔB exists between the drawings B2 and B3, as in step S102. When the difference ΔB exists (step S202: YES), the processing proceeds to step S203. When no difference ΔB exists (step S202: NO), the present processing ends.

Here, suppose that the difference ΔB is "addition of 10 manual valves". Since the drawing A2 is a PFD, manual valves are not included as elements. It is therefore meaningless to provide notification of the difference ΔB to the employee in charge A of the drawing A2. In the case of proceeding from step S202 to step S203, the processor 11 of the drawing management apparatus 10 judges whether any of the elements included in the difference ΔB are necessary for each of the drawings A2 and C2 in step S203. In the example in FIG. 6, the processor 11 can refer to a data table or the like that is stored in the memory 12 and includes information related to the necessity of elements in each type of drawing to make the judgment in step S203. When necessary elements are included in the drawings A2 and C2 (step S203: YES), the processing proceeds to step S204. When necessary elements are not included (step S203: NO), the present processing ends.

In the case of proceeding from step S203 to step S204, the processor 11 of the drawing management apparatus 10 notifies the terminal apparatus A of elements necessary for the drawing A2 among the elements included in the difference ΔB and notifies the terminal apparatus C of elements necessary for the drawing C2 among the elements included in the difference ΔB via the communication interface 13 in step S204. The employee in charge A then uses the terminal apparatus A to create a drawing A3 reflecting the necessary elements among the elements included in the difference ΔB in the drawing A2 and register the drawing A3 in the memory 12 of the drawing management apparatus 10. The employee in charge C uses the terminal apparatus C to create a drawing C3 reflecting the necessary elements among the elements included in the difference ΔB in the drawing C2 and registers the drawing C3 in the memory 12 of the drawing management apparatus 10. In the second processing example, the drawings A and C correspond to the second type of drawing.

According to the second processing example, unnecessary information is not provided to each employee in charge, eliminating unnecessary confirmation and improving work efficiency. The case of providing notification of a difference resulting from a change to the drawing B2 has been described in the second processing example, but notification of a difference resulting from a change to the drawing A2 or C2 may similarly be provided.

Third Processing Example

Figure 7:
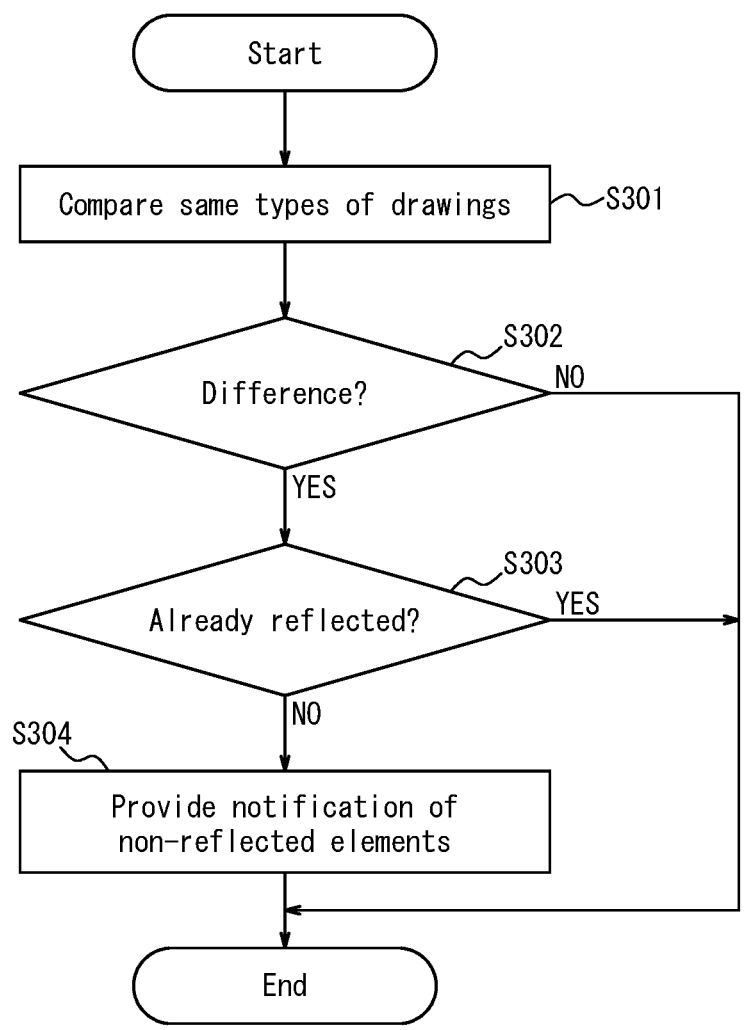
FIG. 7 is a flowchart illustrating a third processing example in the drawing management system according to an embodiment.

A third processing example of the drawing management system 1 according to the present embodiment is described with reference to FIGS. 7 and 8. The third processing example corresponds to an embodiment of a drawing management method according to the present disclosure.

The employee in charge of a certain type of drawing may make corrections or the like to a drawing in parallel with corrections made to another type of drawing. This may be the case when, for example, a certain employee or group is in charge of a plurality of drawings, or when a plurality of employees in charge of drawings cooperate. The difference ΔB due to a change from the drawing B2 to the drawing B3, for example, may therefore already be reflected in the drawings A2 and C2. To address this when notification is to be provided of a difference due to a change in a certain type of drawing, an example of judging in advance whether elements included in the difference have already been reflected in another type of drawing is described in the third processing example.

First, a drawing A2 created by employee in charge A, a drawing B2 created by employee in charge B, and a drawing C2 created by employee in charge C are assumed to be registered in advance in the memory 12 of the drawing management apparatus 10. The drawing A2, drawing B2, and drawing C2 may be registered in any order. The third processing example is assumed to start at the point in time when the employee in charge B has used the terminal apparatus B to change the drawing B2, thereby creating a drawing B3, and to register the drawing B3 in the memory 12 of the drawing management apparatus 10. The processor 11 of the drawing management apparatus 10 may extract the states of the drawing A2, the drawing B3, and the drawing C2 at this point in time as a snapshot or the like. The drawings A2 and A3 are both PFDs and may be abbreviated as the drawing A. The drawings B2 and B3 are both P&IDs and may be abbreviated as the drawing B. The drawings C2 and C3 are both 3D piping diagrams and may be abbreviated as the drawing C. The types of drawings are only non-limiting examples.

In step S301, the processor 11 of the drawing management apparatus 10 acquires the drawings B2 and B3, which are the same type of drawing, from the memory 12 and compares the drawings B2 and B3. In the third processing example, the drawing B2 corresponds to an old version of the first type of drawing, and the drawing B3 corresponds to a new version of the first type of drawing.

In step S302, the processor 11 of the drawing management apparatus 10 judges whether a difference ΔB exists between the drawings B2 and B3, as in step S102. When the difference ΔB exists (step S302: YES), the processing proceeds to step S303. When no difference ΔB exists (step S302: NO), the present processing ends.

In the case of proceeding from step S302 to step S303, the processor 11 of the drawing management apparatus 10 judges whether the elements included in the difference ΔB have already been reflected in each of the drawings A2 and C2 in step S303. For example, the processor 11 can use any appropriate image analysis technique, comparison model, or the like to make the judgment of step S303. When the elements included in the difference ΔB have not yet been reflected in each of the drawings A2 and C2 (step S303: NO), the processing proceeds to step S304, whereas when the elements included in the difference ΔB have already been reflected (step S303: YES), the present processing ends. When a portion of the difference ΔB has been reflected in each type of drawing, whereas another portion is not yet reflected due to omission or the like, the processor 11 excludes the reflected elements and only provides notification via the communication interface 13 of the non-reflected elements in step S304, described below. In the example illustrated in FIG. 8, the processor 11 uses a device ID and a pipe number or the like, acquired after each type of drawing is converted by a conversion model or the like, to judge whether each element included in the difference ΔB between the drawings B2 and B3 has already been reflected in each of the drawings A2 and C2. Here, two "C-Valves (device ID: CV201, CV202, pipe number: L100, L100)" have been added to the drawing B3. "CV201" and "CV202" have already been reflected in the drawing A2. "CV201" has already been reflected in the drawing C2, whereas "CV202" has not.

In the case of proceeding from step S303 to step S304, the processor 11 of the drawing management apparatus 10 notifies the terminal apparatus A of the elements not yet reflected in the drawing A2 among the difference ΔB and notifies the terminal apparatus C of the elements not yet reflected in the drawing C2 among the difference ΔB via the communication interface 13 in step S304. In the example illustrated in FIG. 8, "CV201" and "CV202" have already been reflected in the drawing A2. The terminal apparatus A is therefore not notified. On the other hand, while "CV201" has already been reflected, "CV202" has not yet been reflected in the drawing C2. Notification related to "CV202" is therefore provided to the terminal apparatus C. In the third processing example, the drawings A and C correspond to the second type of drawing.

In conditions such that each employee in charge can reflect changes made to a certain drawing in other drawings, the third processing example prevents each employee in charge from being notified of already reflected information, thereby eliminating unnecessary confirmation and improving work efficiency. The case of providing notification of a difference resulting from a change to the drawing B2 has been described in the third processing example, but notification of a difference resulting from a change to the drawing A2 or C2 may similarly be provided. Furthermore, in step S304, the processor 11 of the drawing management apparatus 10 may provide notification, via the communication interface 13, to the terminal apparatus A and the terminal apparatus C that (1) a change has occurred from the drawing B2 to the drawing B3, (2) a new element has been added to the drawing B2 due to the change, (3) the new element added to the drawing B2 has already been reflected in the drawing A2 or C2, and the like. Alternatively, the processor 11 of the drawing management apparatus 10 may enable each employee in charge to view the reflection status of the difference, via the communication interface 13, as a list that is color-coded, sorted, or the like. The employee in charge may use a switching means or the like to select which of these is to be notified or displayed, and in what manner.

Fourth Processing Example

Figure 9:
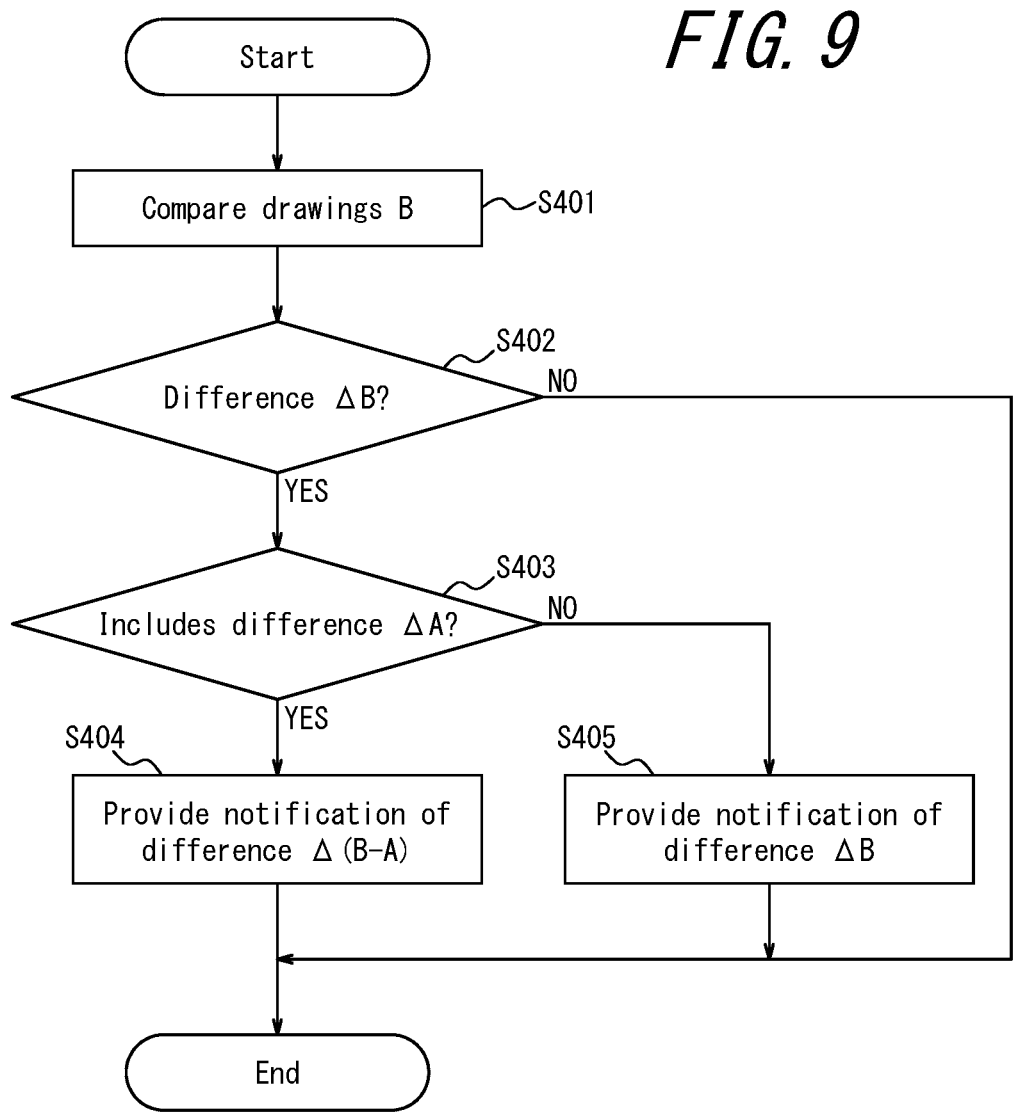
FIG. 9 is a flowchart illustrating a fourth processing example in the drawing management system according to an embodiment.

A fourth processing example of the drawing management system 1 according to the present embodiment is described with reference to FIGS. 9 and 10. The fourth processing example corresponds to an embodiment of a drawing management method according to the present disclosure.

Each employee in charge may make envisioned changes to the employee's own drawing while at the same time reflecting, in the employee's own drawing, the difference resulting from changes made by another employee in charge to the other employee's drawing. Envisioned changes to an employee's own drawing are referred to below as "individual changes". The reflection, in an employee's own drawing, of the difference resulting from changes made by another employee in charge to the other employee's drawing is referred to as "compliance changes". In the fourth processing example, the case of individual changes and compliance changes being made simultaneously is described.

Figure 3:
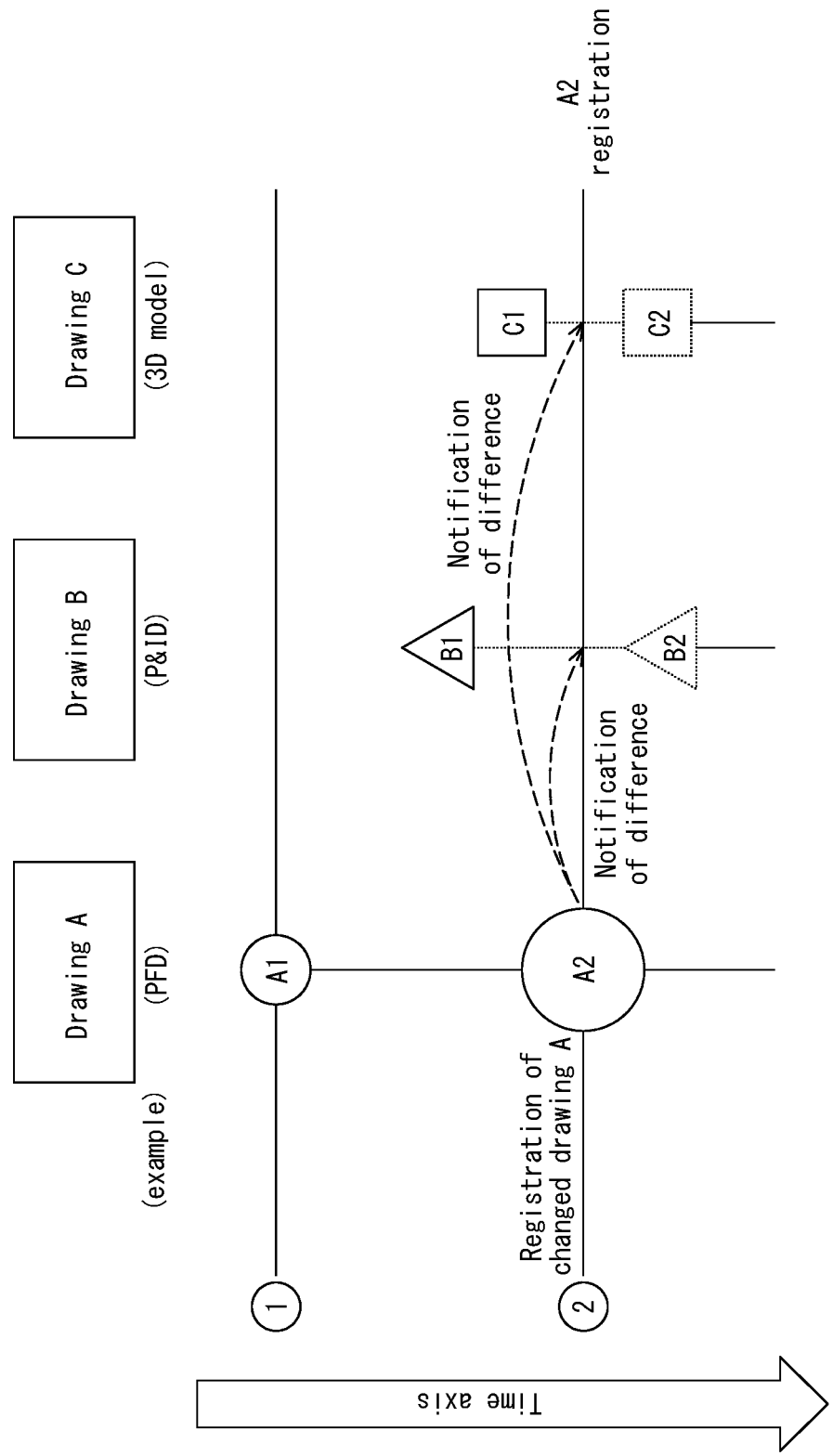
FIG. 3 illustrates an overview of the first processing example.
Figure 10:
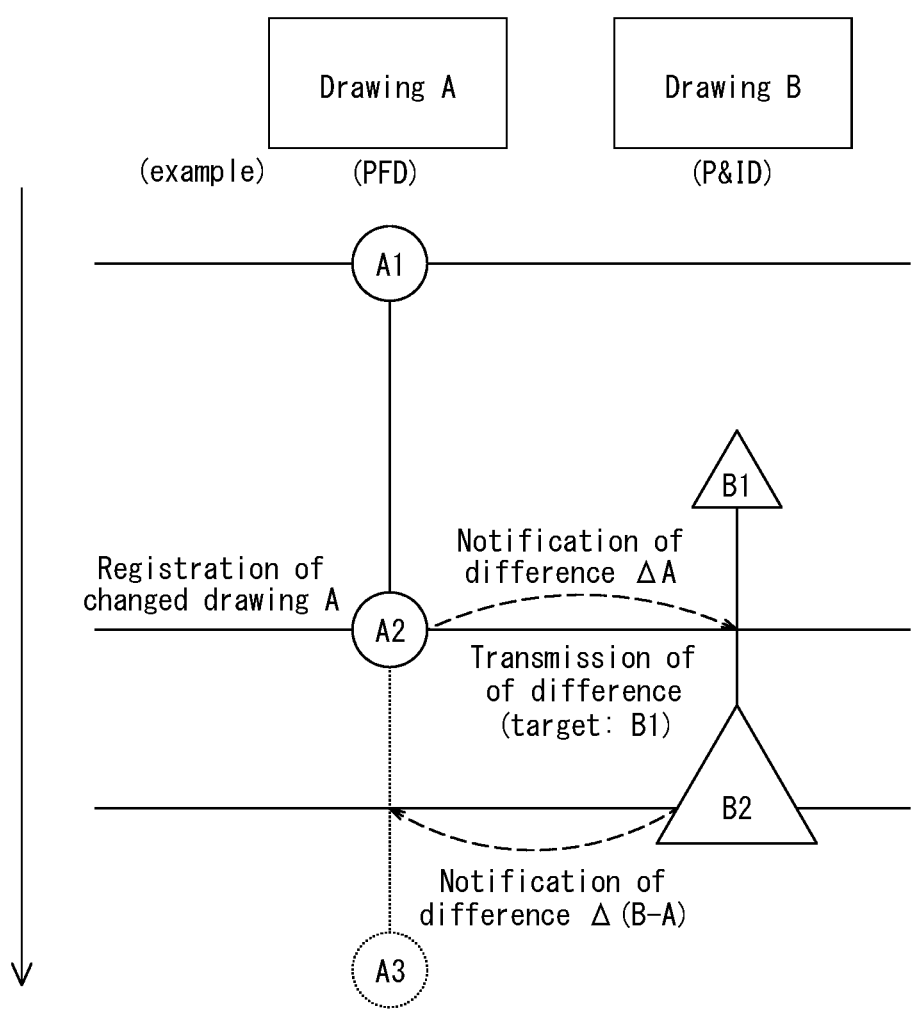
FIG. 10 illustrates an overview of the fourth processing example.

FIG. 10 is an example of processing following FIG. 3. In other words, the latest drawing registered before this point is the drawing A2, and notification of the difference ΔA from the previous drawing A1 has already been provided to the employee in charge or the like of the drawing B1. A description of the drawing C1 is omitted for the sake of simplicity, but this example is not limiting.

The fourth processing example is assumed to start at the point in time when the employee in charge B has used the terminal apparatus B to change the drawing B1, thereby creating a drawing B2, and to register the drawing B2 in the memory 12 of the drawing management apparatus 10. The processor 11 of the drawing management apparatus 10 may extract the states of the drawings A1 and B2 at this point in time as a snapshot or the like. The drawings A1 and A2 are both PFDs and may be abbreviated as the drawing A. The drawings B1 and B2 are both P&IDs and may be abbreviated as the drawing B. The types of drawings are only non-limiting examples.

In step S401, the processor 11 of the drawing management apparatus 10 acquires the drawings B1 and B2, which are the same type of drawing, from the memory 12 and compares the drawings B1 and B2. In the fourth processing example, the drawing B1 corresponds to an old version of the second type of drawing, and the drawing B2 corresponds to a new version of the second type of drawing.

In step S402, the processor 11 of the drawing management apparatus 10 judges whether a difference ΔB exists between the drawings B1 and B2, as in step S102. When the difference ΔB exists (step S402: YES), the processing proceeds to step S403. When no difference ΔB exists (step S402: NO), the present processing ends.

Here, when the employee in charge B has already received notification related to the difference ΔA between the drawings A1 and A2, the employee in charge B might make individual changes to the drawing B1 to create the above-described drawing B2 while simultaneously making compliance changes related to the difference ΔA. In the case of proceeding from step S402 to step S403, the processor 11 of the drawing management apparatus 10 judges whether the difference ΔB includes the difference ΔA in step S403. For example, the processor 11 can use any appropriate image analysis technique, comparison model, or the like to make the judgment of step S403, but these examples are not limiting. When it is judged that the difference ΔB includes the difference ΔA (step S403: YES), the processing proceeds to step S404. When it is judged that the difference ΔB does not include the difference ΔA (step S403: NO), the processing proceeds to step S405.

In the case of proceeding from step S403 to step S404, the processor 11 of the drawing management apparatus 10 notifies the terminal apparatus A of the difference Δ(B−A) between the difference ΔB and the difference ΔA via the communication interface 13 in step S404. In other words, the terminal apparatus A is only notified in FIG. 10 of the difference Δ(B−A) corresponding to the individual changes by the employee in charge B among the changes from the drawing B1 to the drawing B2. While not illustrated in FIG. 10, notification of the difference Δ(B−A) is provided not only to the employee in charge A or the terminal apparatus A but also to an employee in charge or a terminal apparatus that handles drawings other than the drawing A. When receiving the notification related to the change ΔB due to the change to the drawing B, each employee in charge can thereby avoid duplicate receipt, as part of the difference ΔB, of the previously received notification related to the difference ΔA due to a change to the drawing A. Upon receiving the notification related to the difference Δ(B−A) without duplication, each employee in charge creates the employee's own drawing by reflecting the difference Δ(B−A) and registering the result in the memory 12 of the drawing management apparatus 10.

In the case of proceeding from step S403 to step S405, the processor 11 of the drawing management apparatus 10 notifies the terminal apparatus A of the difference ΔB via the communication interface 13 in step S405. The employee in charge A only receives notification of individual changes to the drawing B. The employee in charge A therefore uses the terminal apparatus A to create a drawing A3 reflecting the difference ΔB in the drawing A2 and registers the drawing A3 in the memory 12 of the drawing management apparatus 10. Other employees in charge of the drawing C or the like also receive notification only of the difference ΔB due to individual changes to the drawing B, without the difference ΔA (i.e. A2−A1) for which notification was already received. No duplication therefore occurs in the received information, preventing confusion. In the fourth processing example, the drawings A2 and A3 correspond to the second type of drawing.

According to the fourth processing example, when the employee in charge B makes envisioned changes to the employee's own drawing B while at the same time reflecting, in the employee's own drawing B, the difference resulting from changes made by another employee in charge A to the other employee's drawing A, such information can be separated and notification provided without duplication. This efficient notification and confirmation can guarantee consistency between various types of drawings. When creating the drawing B2 from the drawing B1, the employee in charge B may use a function such as an editing tool to appropriately set information indicating "compliance changes only", "compliance changes and individual changes", "individual changes only", or the like and associate this information with the drawing B2. In this case, the processor 11 of the drawing management apparatus 10 can use this information to judge whether the difference ΔB includes the difference ΔA in step S403.

Fifth Processing Example

Figure 11:
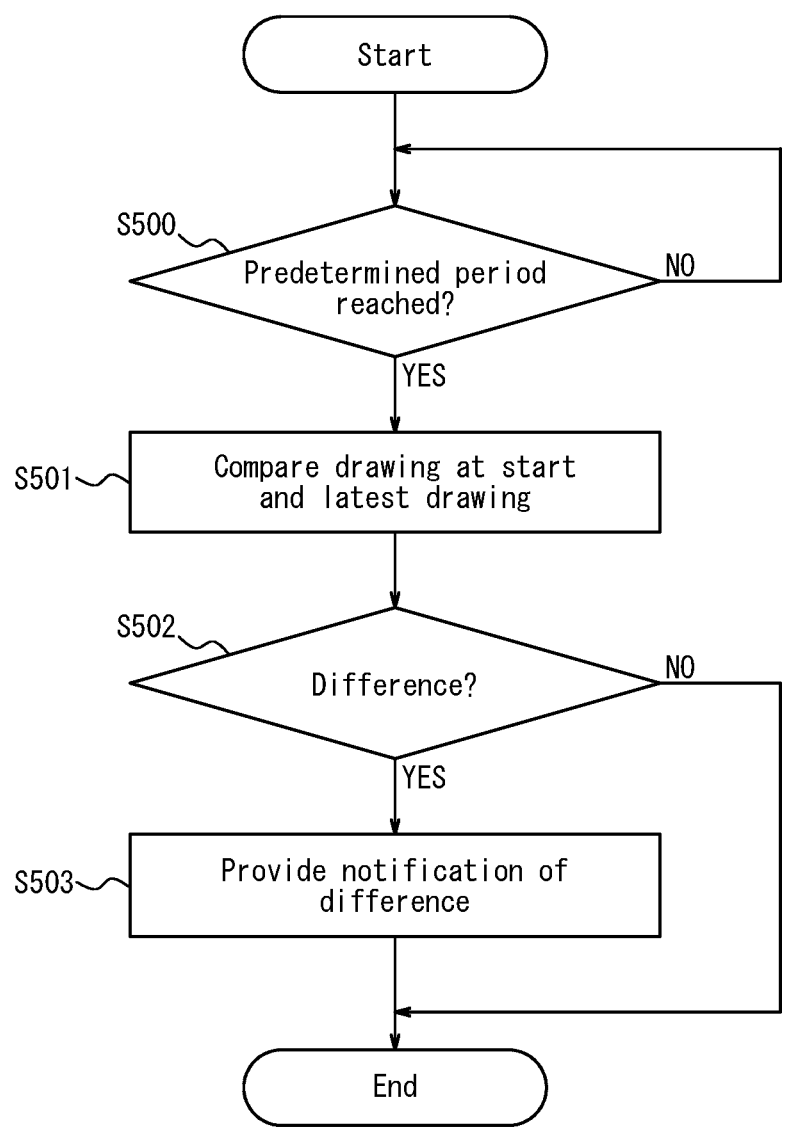
FIG. 11 is a flowchart illustrating a fifth processing example in the drawing management system according to an embodiment.

A fifth processing example of the drawing management system 1 according to the present embodiment is described with reference to FIGS. 11 and 12. The fifth processing example corresponds to an embodiment of a drawing management method according to the present disclosure.

Figure 12:
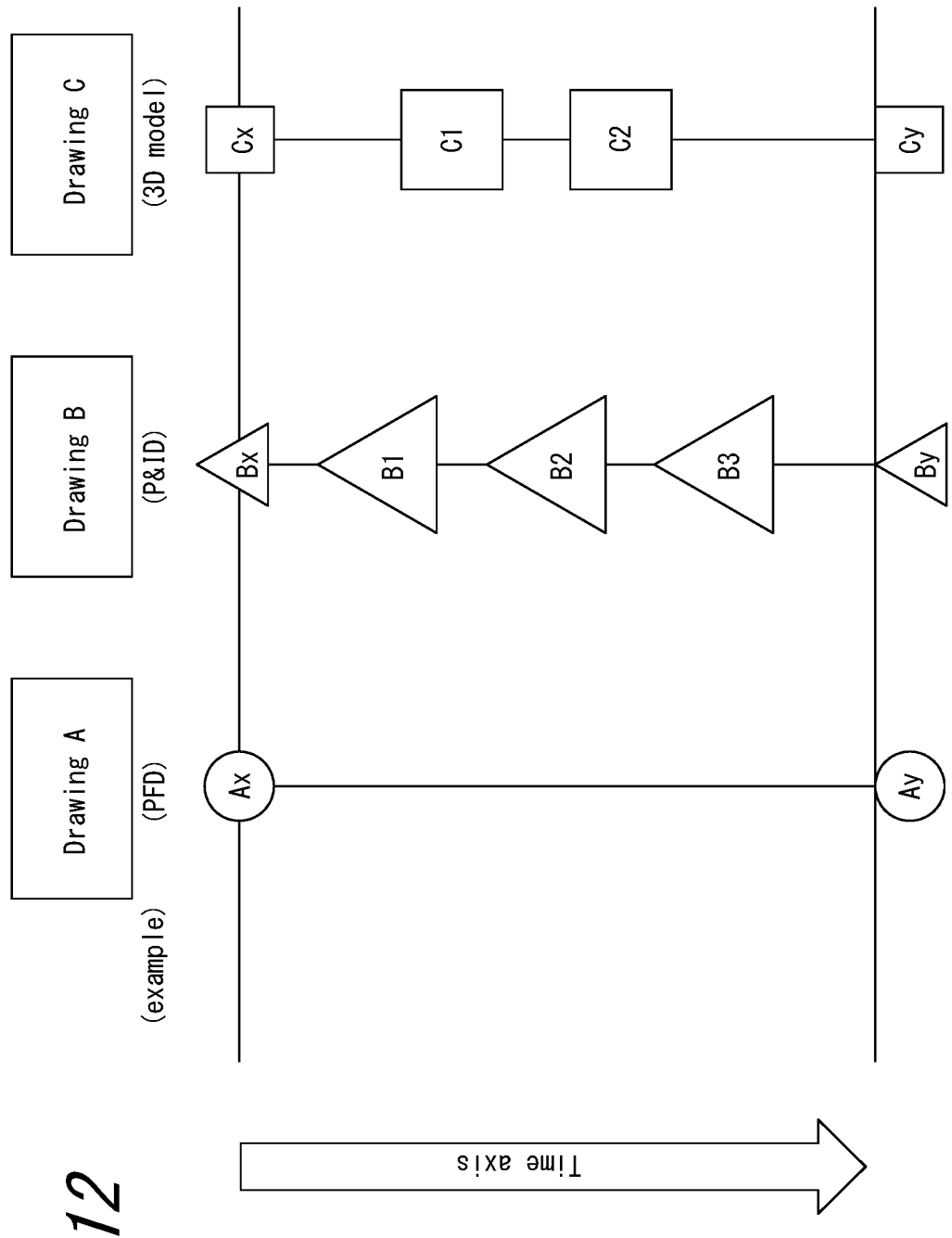
FIG. 12 illustrates an overview of the fifth processing example.

In the fifth processing example, it is assumed that between the start and the time when a predetermined period is reached, no changes are made to drawing A, which corresponds to the second type of drawing; three changes, i.e. drawings B1 through B3, are made to the drawing B, which corresponds to a first type a of drawing; and two changes, i.e. drawings C1 and C2, are made to the drawing C, which corresponds to a first type b of drawing, as illustrated in FIG. 12.

In step S500, the processor 11 of the drawing management apparatus 10 judges whether a predetermined period has been reached from the start. Here, the start corresponds to the time when the previous predetermined period was reached. When the period from the start has reached a predetermined period (step S500: YES), the processor 11 proceeds to step S501. When the period from the start has not reached a predetermined period (step S500: NO), the processor 11 stands by. The "predetermined period" may be appropriately set by the user, such as an employee in charge, to be one week, one month, three months, or the like. However, these examples are not limiting.

In the case of proceeding from step S500 to step S501, the processor 11 of the drawing management apparatus 10 compares a drawing Bx at the start and the latest drawing B3 in step S501 with regard to the drawing B that was changed between the start and the time when the predetermined period was reached. The processor 11 compares a drawing Cx at the start and the latest drawing C2 with regard to the drawing C that was changed between the start and the time when the predetermined period was reached. In the fifth processing example, the drawing Bx corresponds to an old version of the first type a of drawing, and the drawing B3 corresponds to a new version of the first type a of drawing. The drawing Cx corresponds to an old version of the first type b of drawing, and the drawing C2 corresponds to a new version of the first type b of drawing.

In step S502, the processor 11 of the drawing management apparatus 10 judges whether a difference Δ(B3−Bx) exists between the drawings Bx and B3, as in step S102. The processor 11 judges whether a difference Δ(C2−Cx) exists between the drawings Cx and C2, as in step S102. When a difference exists (step S502: YES), the processing proceeds to step S503. When no difference exists (step S502: NO), the present processing ends.

The processor 11 of the drawing management apparatus 10 notifies the terminal apparatus A of the difference Δ(B3−Bx) and the difference Δ(C2−Cx) via the communication interface 13 in step S503. The processor 11 notifies the terminal apparatus B of the difference Δ(C2−Cx) via the communication interface 13. The processor 11 notifies the terminal apparatus C of the difference Δ(B3−Bx) via the communication interface 13. The employee in charge A then uses the terminal apparatus A to create a drawing Ay reflecting the difference Δ(B3−Bx) and the difference Δ(C2−Cx) in the drawing Ax and register the drawing Ay in the memory 12 of the drawing management apparatus 10. In this case, the drawing A that is the recipient of notification corresponds to the second type of drawing. The employee in charge B then uses the terminal apparatus B to create a drawing By reflecting the difference Δ(C2−Cx) in the drawing Bx and register the drawing By in the memory 12 of the drawing management apparatus 10. In this case, the drawing C that is the recipient of notification corresponds to the first type of drawing, and the drawing B that is the recipient of notification corresponds to the second type of drawing. The employee in charge C uses the terminal apparatus C to create a drawing Cy reflecting the difference Δ(B3−Bx) in the drawing Cx and registers the drawing Cy in the memory 12 of the drawing management apparatus 10. In this case, the drawing B that is the recipient of notification corresponds to the first type of drawing, and the drawing C that is the recipient of notification corresponds to the second type of drawing. In this way, the user, such as an employee in charge, or the terminal apparatus that handles each type of drawing is notified only of necessary information.

When drawings are frequently registered in the drawing management system 1, frequent notification is avoided according to the fifth processing example, since each employee in charge is not notified of the difference between an old and new version every time a drawing is registered. Each employee in charge therefore need not continuously reflect changes in the employee's own drawings. According to the fifth processing example, each employee in charge can appropriately set the timing of notification to control the frequency with which the employee needs to reflect changes in the employee's own drawings. This improves work efficiency and convenience. Different employees in charge might correct the same location in the same way in the drawings B and C. This case is prominent when the employees in charge overlap between the drawings B and C. To address this, the processor 11 of the drawing management apparatus 10 may, in step S503, identify (1) changes common to drawings B and C, (2) changes only in drawing B, and (3) changes only in drawing C among the difference Δ(B3−Bx) and the difference Δ(C2−Cx) and notify the terminal apparatuses A, B, C of the information necessary for each apparatus via the communication interface 13. In other words, the processor 11 of the drawing management apparatus 10 needs to notify the terminal apparatus A of all of the information but only needs to notify the terminal apparatus B of at least the changes (3) and the terminal apparatus C of at least the changes (2). For the employees in charge A, B, and C to have a common understanding as they work, however, the processor 11 of the drawing management apparatus 10 may also notify the terminal apparatus B of the changes (1) and (2) and notify the terminal apparatus C of the changes (1) and (3).

Sixth Processing Example

Figure 13:
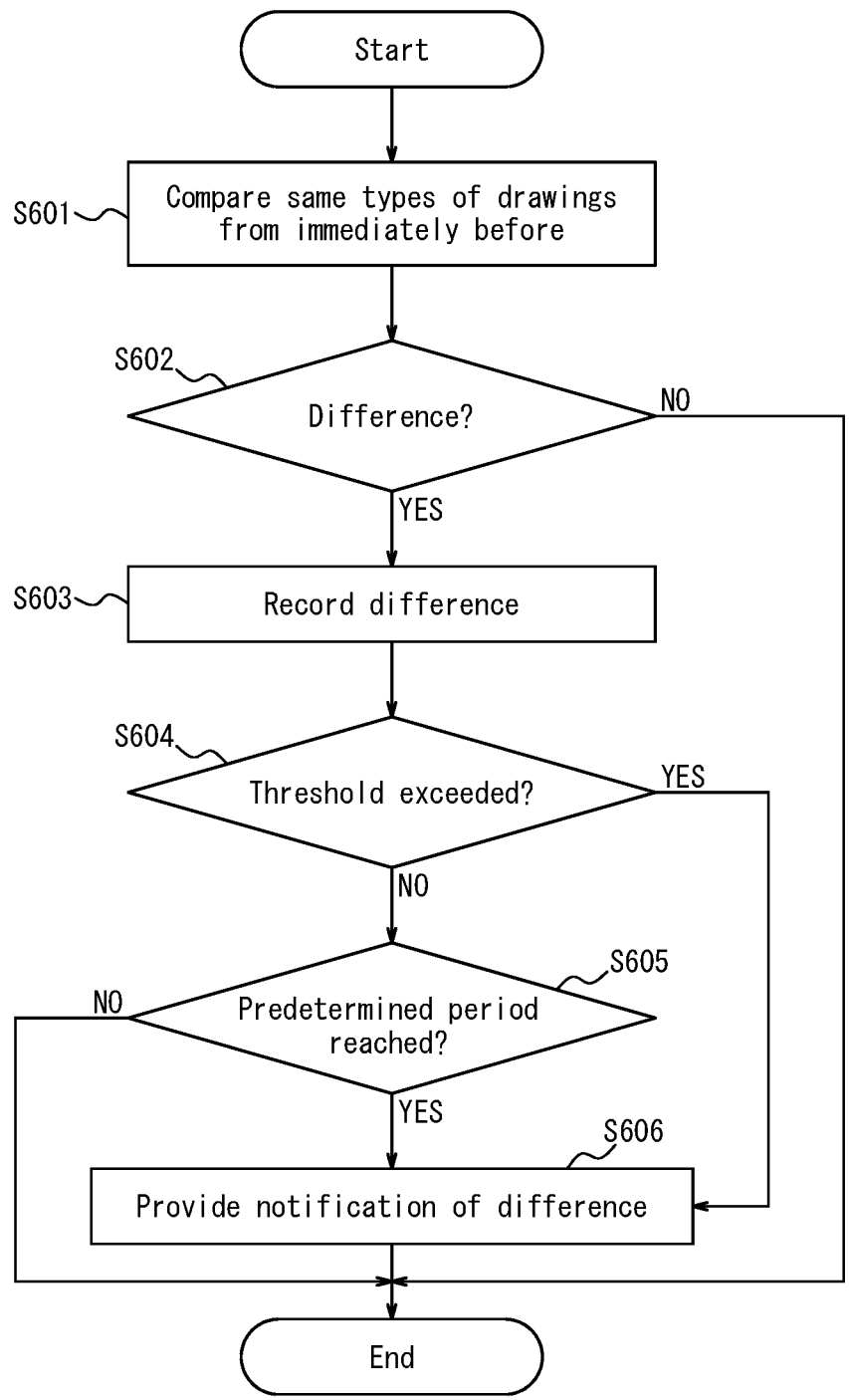
FIG. 13 is a flowchart illustrating a sixth processing example in the drawing management system according to an embodiment.

A sixth processing example of the drawing management system 1 according to the present embodiment is described with reference to FIG. 13. The sixth processing example corresponds to an embodiment of a drawing management method according to the present disclosure.

As in the fifth processing example, it is assumed that in the case of collectively providing notification of changes made in a predetermined period, numerous corrections or the like have been made to the drawings at a certain point in time before a predetermined period is reached from the start. In such a case, work time may be lost if each employee in charge does not receive notification related to the changes to the drawings until the predetermined period is reached. It may not be desirable for each employee in charge to stand by, without receiving notification, until the predetermined period is reached if the delivery deadline is approaching, for example. In the case of numerous corrections or the like having been made to the drawings at a certain point in time before a predetermined period is reached from the start, an example of providing notification related to drawings to each employee in charge even though the predetermined period has not been reached from the start is therefore described in the sixth processing example.

First, a drawing A1 created by employee in charge A, a drawing B1 created by employee in charge B, and a drawing C1 created by employee in charge C are assumed to be registered in advance in the memory 12 of the drawing management apparatus 10. The drawing A1, drawing B1, and drawing C1 may be registered in any order. The sixth processing example starts at the point in time when the employee in charge A has used the terminal apparatus A to change the drawing A1, thereby creating a drawing A2, and has registered the drawing A2 in the memory 12 of the drawing management apparatus 10. The processor 11 of the drawing management apparatus 10 may extract the states of the drawing A2, the drawing B1, and the drawing C1 at this point in time as a snapshot or the like. The drawings A1 and A2 are both PFDs and may be abbreviated as the drawing A. The drawings B1 and B2 are both P&IDs and may be abbreviated as the drawing B. The drawing C1 and the drawing C2 are both 3D piping diagrams and may be abbreviated as the drawing C. The types of drawings are only non-limiting examples.

In step S601, the processor 11 of the drawing management apparatus 10 compares the drawings A1 and A2, which are the same type of drawing. In the sixth processing example, the drawings A1 and A2 correspond to the first type of drawing.

In step S602, the processor 11 of the drawing management apparatus 10 judges whether a difference ΔA exists between the drawings A1 and A2, as in step S102. When the difference ΔA exists (step S602: YES), the processing proceeds to step S603. When no difference ΔA exists (step S602: NO), the present processing ends.

In the case of proceeding from step S602 to step S603, the processor 11 of the drawing management apparatus 10 records the difference ΔA in the memory 12.

In step S604, the processor 11 of the drawing management apparatus 10 judges whether the difference ΔA exceeds a predetermined threshold. When the difference ΔA exceeds the predetermined threshold (step S604: YES), the processing proceeds to step S606. When the difference ΔA does not exceed the predetermined threshold (step S604: NO), the processing proceeds to step S605. The "predetermined threshold" is appropriately set by the employee in charge as, for example, a threshold on the number of changes in elements or attributes included in the drawing and is used for providing notification when a predetermined number is reached, for example. However, these examples are not limiting.

In the case of proceeding from step S604 to step S605, the processor 11 of the drawing management apparatus 10 judges whether the period from the start has reached a predetermined period in step S605. When the period from the start has reached a predetermined period (step S605: YES), the processing proceeds to step S606. When the period from the start has not reached a predetermined period (step S605: NO), the present processing ends. The "predetermined period" may be appropriately set by the employee in charge to be one week, one month, three months, or the like. However, these examples are not limiting. The processing of step S605 may be omitted, but including the processing of step S605 can reduce the notification frequency while enabling each employee in charge to respond quickly when numerous corrections or the like, exceeding a predetermined threshold, are made.

In the case of proceeding from step S604 to step S606, or in the case of proceeding from step S605 to step S606, the processor 11 of the drawing management apparatus 10 notifies each terminal apparatus of the difference via the communication interface 13 in step S606. When, as a result of proceeding from step S604 to step S606, notification of the difference is provided before the predetermined period is reached from the start, the processor 11 of the drawing management apparatus 10 may again start the flow for recording the difference in the remaining portion of the predetermined period. During the notification when the predetermined period is reached from the start after proceeding from step S605 to step S606, the processor 11 of the drawing management apparatus 10 preferably avoids notification of duplicate information by removing information included in a previously provided notification. While not illustrated in FIG. 13, after the difference ΔA exceeds a predetermined threshold and the processor 11 provides notification before the predetermined period is reached, the processor 11 returns to step S601 and accumulates the difference in the remaining period until the predetermined period is reached. When the predetermined period is reached, the processor 11 provides notification related to the accumulated difference. For example, suppose that the predetermined period is one week, and the processor 11 provides notification related to the difference ΔA when the difference ΔA exceeds the predetermined threshold after three days have passed since the start. In this case, the processor 11 provides notification of the non-notified difference occurring in the remaining four days. This processing enables each employee in charge to respond flexibly, without disrupting the schedule, even when the notification related to the difference is set to be provided at the end of each week or the end of each month.

According to the sixth processing example, if corrections or the like exceeding a predetermined threshold are made to a drawing at a certain point in time after the start, each employee in charge is notified of the difference resulting from the changes to the drawing, even if the predetermined period has not been reached from the start. Work efficiency and convenience are thereby further increased.

The present disclosure is based on drawings and embodiments, but it should be noted that a person of ordinary skill in the art could make a variety of changes or modifications based on the present disclosure. Therefore, such changes and modifications are to be understood as included within the scope of the present disclosure. For example, the functions and the like included in the various steps and the like may be reordered in any logically consistent way. Furthermore, a plurality of steps or the like may be combined into one, or a single step or the like may be divided.

Figure 14:
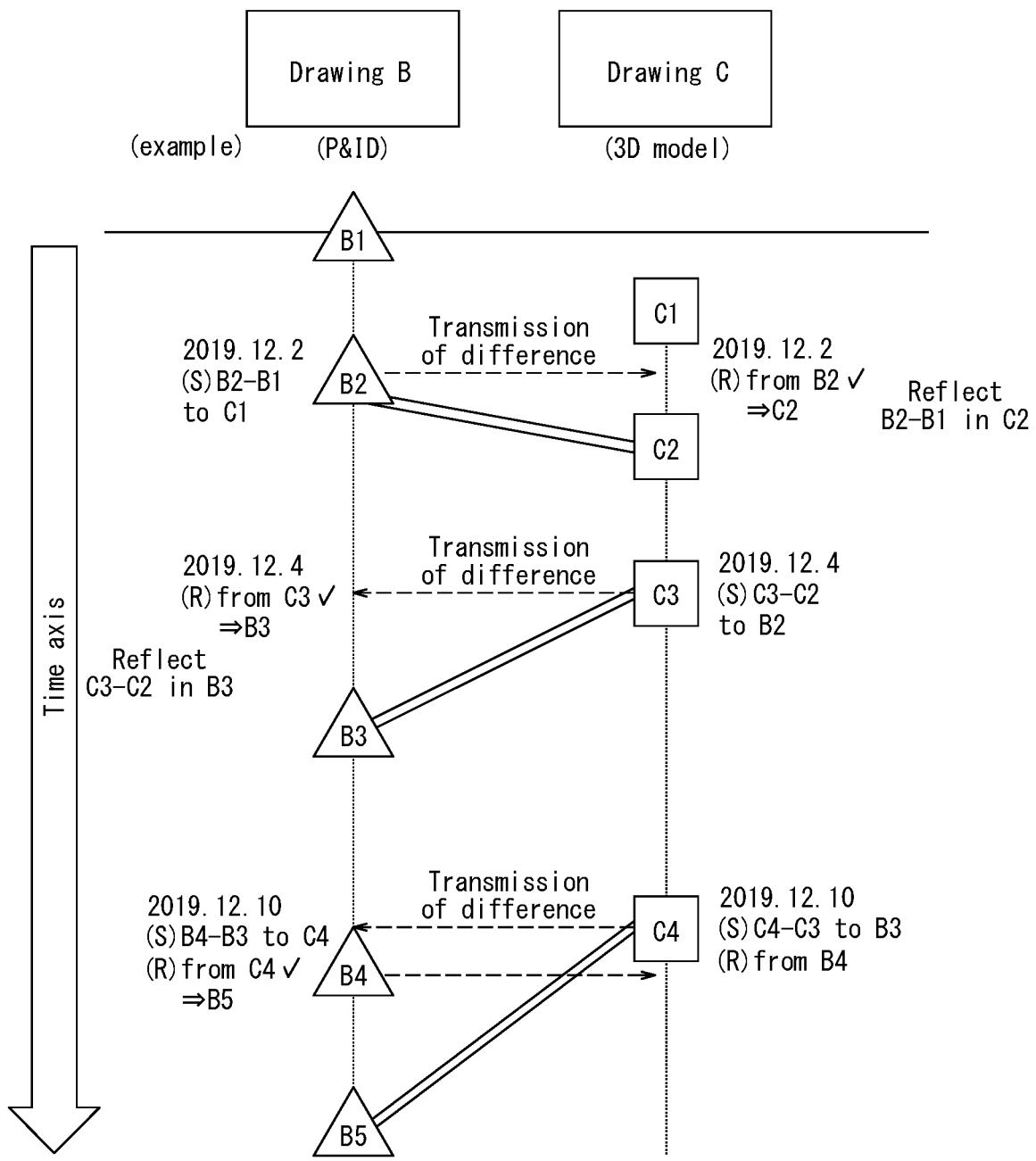
FIG. 14 illustrates an overview of a modification.

As one modification, the processor 11 of the drawing management apparatus 10 may enable each employee in charge to view a chart, illustrated in FIG. 14, recording the exchange between different types of drawings. Each employee in charge can thereby easily learn the relationship between different types of drawings. In FIG. 14, the date is either the registration date of each type of drawing or the date of transmission of the difference. While not illustrated, the time or the like may also be displayed. In FIG. 14, (S) indicates "Sent". (R) indicates "Received". "(S)B2–B1 to C1" indicates that the difference Δ(B2–B1) was transmitted to the drawing C1 existing at that point. "(R) from B2" indicates that the difference was transmitted to the drawing Cl existing at that point. "check mark→C2" indicates that the drawing C2 was created by reflecting the difference in the drawing C1. For example, the "drawing B2" and the "drawing C2" that correspond are displayed as connected by any notation, such as a double line. When no "check mark" is displayed, the difference has been transmitted from the drawing B but not yet reflected in the drawing C.

When the employee in charge B registers the drawing B4 and the employee in charge C registers the drawing C4 at the same time or substantially the same time in the drawing management system 1, for example, as illustrated in FIG. 14, the processor 11 of the drawing management apparatus 10 may perform the various processing in units of time or units of seconds. When the employee in charge C registers the drawing C4 at 13:00:00 on Dec. 10, 2019, for example, the processor 11 of the drawing management apparatus 10 determines, by a snapshot or the like, the other drawings existing at this time as drawings in which the difference is to be reflected. Specifically, suppose that the drawing B4 is registered at 13:00:30 on Dec. 10, 2019. The drawing B3 existing at 13:00:00 is then determined, by a snapshot or the like, as a drawing in which the difference is to be reflected. Alternatively, the processor 11 of the drawing management apparatus 10 may determine, by a snapshot or the like, the drawing B4 and the drawing C4 registered between 13:00:00 and 13:00:59 on Dec. 10, 2019 as drawings in which the difference is to be reflected. This period is appropriately set by each employee in charge. Alternatively, each employee in charge may appropriately determine the drawings in which the difference is to be reflected.

Figure 15:
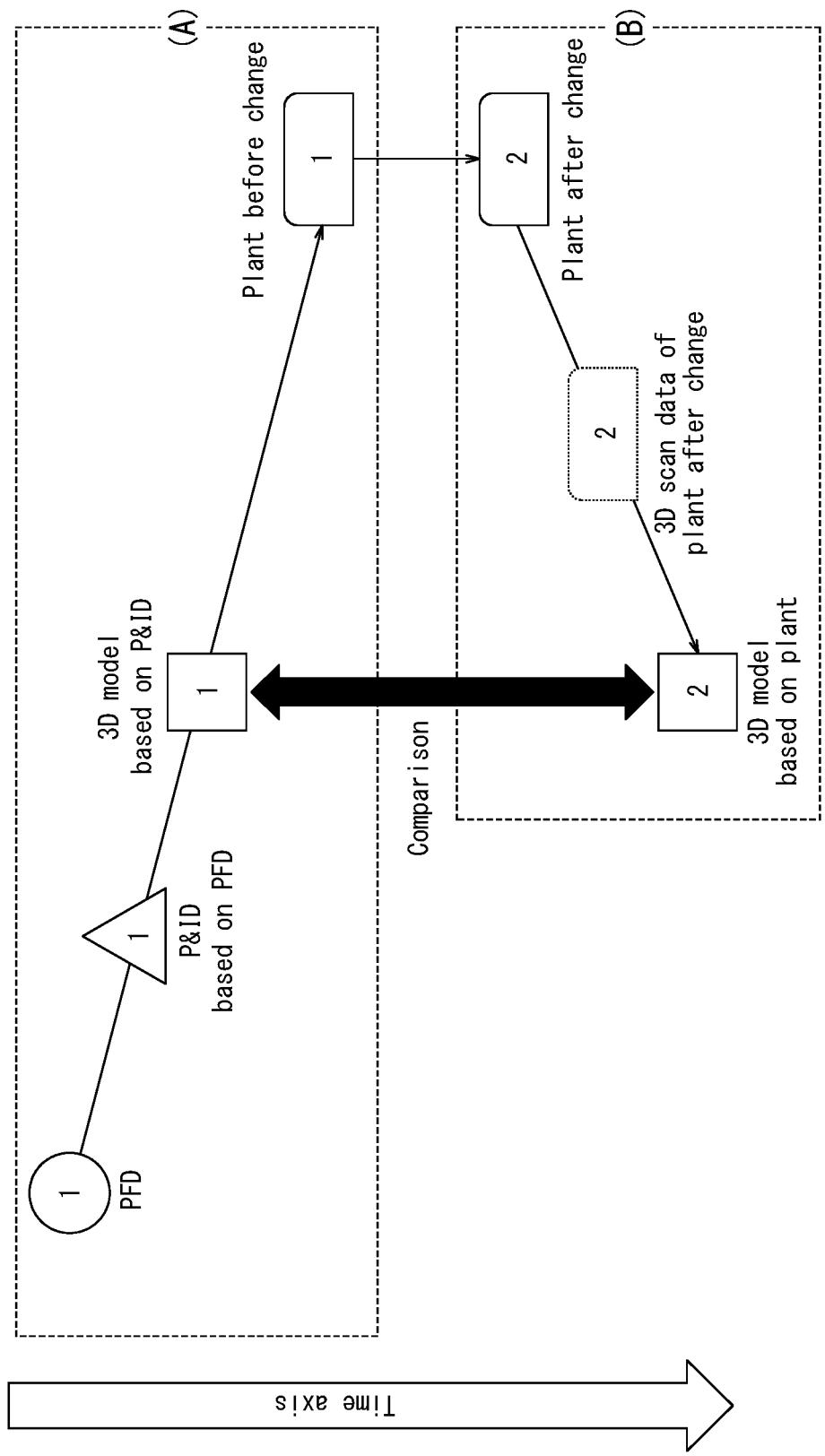
FIG. 15 illustrates an overview of a modification.

As one modification, a PFD is first created, a P&ID is then created based on the PFD, a 3D piping diagram is created based on the P&ID, and each device and the like is arranged based on the 3D piping diagram to build the plant 20 in the example in (A) of FIG. 15. When changing the plant 20 by the exchange, repair, or the like of parts, each employee in charge might not refer to the drawings one by one or might not completely follow the drawings. To address this issue, a 3D scanning apparatus or the like is used in the example illustrated in (B) of FIG. 15 to create 3D scan data by imaging the outline of the plant after the change. A 3D piping diagram is then created based on the 3D scan data, and a P&ID and a PFD are created based on the 3D piping diagram. In this case, the processor 11 of the drawing management apparatus 10 acquires the difference based on a comparison between the 3D piping diagram created from the 3D scan data and the 3D piping diagram already created based on the P&ID and the like and notifies each employee in charge of the PFD and the P&ID via the communication interface 13. In this way, the latest information of the plant 20 is reflected in each type of drawing of the plant 20, securing consistency between the current state of the plant 20 and each type of drawing of the plant 20. Each type of drawing may include information indicating whether the drawing was created by the path in the example (A) or (B) of FIG. 15 and information indicating the creation date and time or the like of the drawing.

INDUSTRIAL APPLICABILITY

According to the present disclosure, a drawing management apparatus, a drawing management system, and a drawing management method capable of securing consistency between various types of drawings, and hence consistency between the drawings and an actual plant, can be provided.

The invention claimed is:

1. A drawing management apparatus for managing various types of drawings of a plant, the drawing management apparatus comprising a processor and a communication interface;
   wherein the processor is configured to notify, via the communication interface, a user or terminal apparatus handling a second type of drawing different from a first type of drawing of information related to a difference in the first type of drawing acquired based on a comparison between a new version and an old version of the first type of drawing; and
   wherein the processor is configured to notify, via the communication interface, the user or the terminal apparatus handling the second type of drawing of information related to an element necessary in the second type of drawing among elements included in the difference in the first type of drawing.

2. The drawing management apparatus of claim 1, wherein the processor is configured to refer to a data table including information related to necessity of elements in the various types of drawing of the plant and to judge whether any of the elements included in the difference in the first type of drawing is necessary in the second type of drawing.

3. The drawing management apparatus of claim 2, wherein the processor is configured to notify, via the communication interface, the user or the terminal apparatus handling the second type of drawing of information related to an element not reflected in the second type of drawing among elements included in the difference in the first type of drawing.

4. The drawing management apparatus of claim 3, wherein the processor is configured to perform the comparison when acquiring the new version of the first type of drawing.

5. The drawing management apparatus of claim 2, wherein the processor is configured to perform the comparison when acquiring the new version of the first type of drawing.

6. The drawing management apparatus of claim 1, wherein the processor is configured to notify, via the communication interface, the user or the terminal apparatus handling the second type of drawing of information related to an element not reflected in the second type of drawing among elements included in the difference in the first type of drawing.

7. The drawing management apparatus of claim 6, wherein the processor is configured to perform the comparison when acquiring the new version of the first type of drawing.

8. The drawing management apparatus of claim 1, wherein the processor is configured to perform the comparison when acquiring the new version of the first type of drawing.

9. The drawing management apparatus of claim 1, wherein the processor is configured to perform the comparison when a predetermined period is reached.

10. A drawing management apparatus for managing various types of drawings of a plant, the drawing management apparatus comprising a processor and a communication interface;
   wherein the processor is configured to notify, via the communication interface, a user or terminal apparatus handling a second type of drawing different from a first type of drawing of information related to a difference in the first type of drawing acquired based on a comparison between a new version and an old version of the first type of drawing; and
   wherein the processor is configured to notify, via the communication interface, the user or the terminal apparatus handling the second type of drawing of information related to an element not reflected in the second type of drawing among elements included in the difference in the first type of drawing.

11. The drawing management apparatus of claim 10, wherein the processor is configured to perform the comparison when acquiring the new version of the first type of drawing.

12. A drawing management method for managing various types of drawings of a plant using a computer, the drawing management method comprising:
   using a drawing management apparatus for managing various types of drawings of a plant, the drawing management apparatus comprising a processor and a communication interface;
      wherein the processor is configured to notify, via the communication interface, a user or terminal apparatus handling a second type of drawing different from a first type of drawing of information related to a difference in the first type of drawing acquired based on a comparison between a new version and an old version of the first type of drawing;
      wherein the processor is configured to notify, via the communication interface, the user or the terminal apparatus handling the second type of drawing of information related to an element necessary in the second type of drawing among elements included in the difference in the first type of drawing; and
   notifying a user or terminal apparatus handling a second type of drawing different from a first type of drawing of information related to a difference in the first type of drawing acquired based on a comparison between a new version and an old version of the first type of drawing.

13. A drawing management method for managing various types of drawings of a plant using a computer, the drawing management method comprising:
   using a drawing management apparatus for managing various types of drawings of a plant, the drawing management apparatus comprising a processor and a communication interface;
      wherein the processor is configured to notify, via the communication interface, a user or terminal apparatus handling a second type of drawing different from a first type of drawing of information related to a difference in the first type of drawing acquired based on a comparison between a new version and an old version of the first type of drawing;
      wherein the processor is configured to notify, via the communication interface, the user or the terminal apparatus handling the second type of drawing of information related to an element not reflected in the second type of drawing among elements included in the difference in the first type of drawing; and
   notifying a user or terminal apparatus handling a second type of drawing different from a first type of drawing of information related to a difference in the first type of drawing acquired based on a comparison between a new version and an old version of the first type of drawing.

* * * * *